US012769330B2

(12) United States Patent
Hanna et al.

(10) Patent No.: US 12,769,330 B2
(45) Date of Patent: Oct. 20, 2026

(54) DEFINING NO-GO ZONES FOR AN AUTONOMOUS MOWER

(71) Applicant: ASI Landscaping, LLC, Mendon, UT (US)

(72) Inventors: Shawn Karl Hanna, Denver, CO (US); Isaac Heath Roberts, Lyons, CO (US); John Gordon Morrison, Longmont, CO (US); Davis Thorp Foster, Boulder, CO (US)

(73) Assignee: ASI Landscaping, LLC, Mendon, UT (US)

( * ) Notice: Subject to any disclaimer, the term of this patent is extended or adjusted under 35 U.S.C. 154(b) by 0 days.

(21) Appl. No.: 18/970,188

(22) Filed: Dec. 5, 2024

(65) Prior Publication Data

US 2026/0161171 A1 Jun. 11, 2026

(51) Int. Cl.

| | |
|---|---|
| ***G05D 1/00*** | (2024.01) |
| ***G05D 1/622*** | (2024.01) |
| ***G05D 1/648*** | (2024.01) |
| *G05D 105/15* | (2024.01) |

(52) U.S. Cl.

CPC ........... *G05D 1/637* (2024.01); *G05D 1/6484* (2024.01); *G05D 2105/15* (2024.01)

(58) Field of Classification Search

CPC ... G05D 1/637; G05D 1/6484; G05D 2105/15
USPC ............................................................ 701/50
See application file for complete search history.

(56) References Cited

U.S. PATENT DOCUMENTS

| | | | | |
|---|---|---|---|---|
| 9,516,806 | B2 | 12/2016 | Yamauchi et al. | |
| 11,899,463 | B1 | 2/2024 | Afrouzi et al. | |
| 12,245,545 | B1 * | 3/2025 | Blanton, Jr. | G05D 1/242 |
| 2008/0249659 | A1 | 10/2008 | Ueyama | |
| 2019/0212752 | A1 | 7/2019 | Fong et al. | |
| 2020/0047343 | A1 | 2/2020 | Bal et al. | |
| 2020/0050208 | A1 | 2/2020 | Frick et al. | |
| 2023/0161357 | A1 | 5/2023 | Liljedahl et al. | |
| 2024/0069561 | A1 * | 2/2024 | Lee | G05D 1/6484 |

FOREIGN PATENT DOCUMENTS

| | | | |
|---|---|---|---|
| CN | 111523334 | B | 8/2020 |
| CN | 111973079 | B | 11/2020 |
| CN | 113892858 | A | 1/2022 |

(Continued)

*Primary Examiner* — Tiffany P Young

(57) ABSTRACT

Methods for defining a no-go zone for an autonomous mower are provided including: positioning the autonomous mower in a stationary pose having a position and an orientation near an area to avoid mowing; using the position and the orientation to set a perimeter bounding the area to avoid, wherein the perimeter defines the no-go zone for the autonomous mower; and storing the set perimeter as the no-go zone. Methods are also provided for defining a no-go zone for an autonomous mower that include: positioning the autonomous mower at a start point on a desired perimeter around an area to avoid; starting perimeter recording; directing the autonomous mower to trace around the area to avoid while recording positions of the autonomous mower; stopping recording when the autonomous mower returns to or near the start point; and storing the recorded positions of the autonomous mower as a perimeter defining the no-go zone.

16 Claims, 7 Drawing Sheets

(56) References Cited

FOREIGN PATENT DOCUMENTS

| | | | |
|---|---|---|---|
| CN | 115454058 | A | 12/2022 |
| CN | 115756233 | A | 3/2023 |
| CN | 117369445 | A | 1/2024 |

* cited by examiner

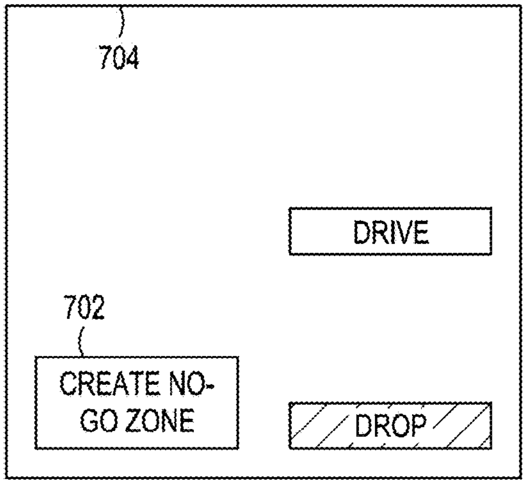
FIG. 7A
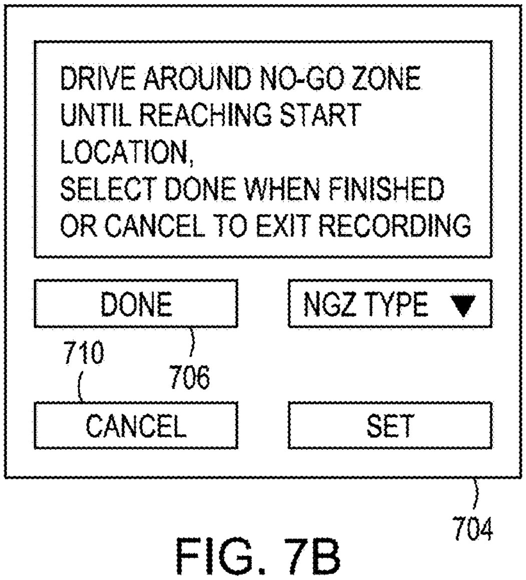
FIG. 7B
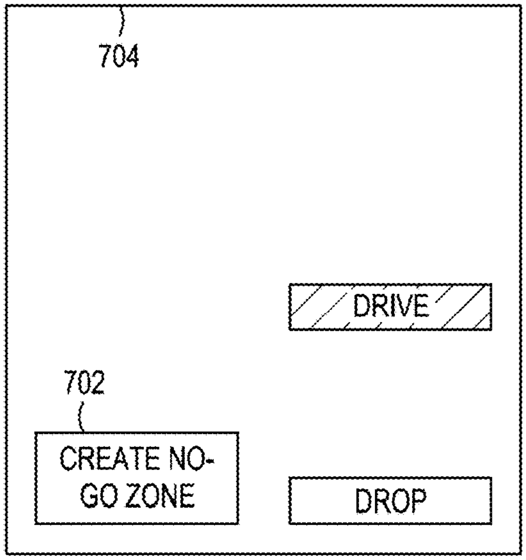
FIG. 7C
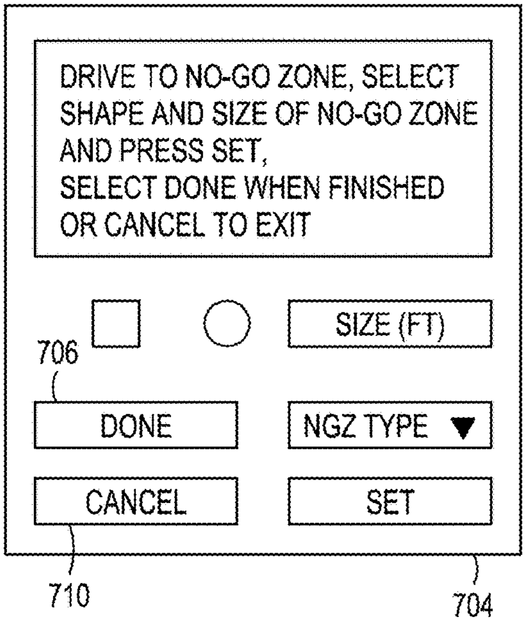
FIG. 7D
FIG. 7E
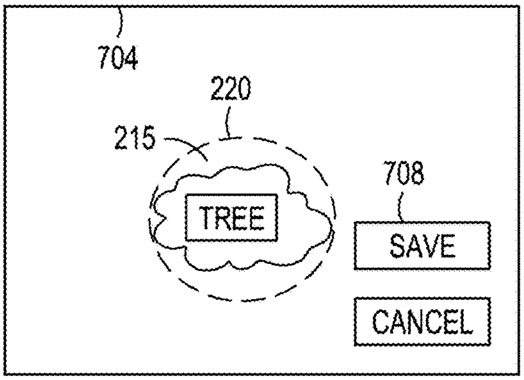

DEFINING NO-GO ZONES FOR AN AUTONOMOUS MOWER

BACKGROUND

Autonomous operation of a lawn mower to cut grass on an area of turf can allow a landscape maintenance crew to be more efficient. While a mower is mowing a portion of the property autonomously, the crew members can focus on doing the detail maintenance work, such as trimming edges next to sidewalks and planter beds, trimming trees and bushes, and cleaning out weeds.

One strategy for enabling autonomous mowing is to set an enclosed area that bounds all of the turf that is intended to be mowed, and allow the autonomous mower to operate within that enclosed area and prevent it from exiting and operating outside of it. That enclosed space can be referred to as a "mow zone." Some mow zones may contain certain areas where mowing is not intended, and it may be desirable to establish these areas as "no-go zones" (NGZs). The autonomous mower has systems which allow it to calculate a path to mow, and that mow path will cover all of the area that is (i) within the mow zone, but is (ii) not within a no-go zone.

Establishing what is a mow zone and what is a no-go zone may be a task which an operator must do in order to setup the autonomous mower to work autonomously. It's desirable that the establishment of mow zones and no-go zones can be done rapidly, in an easily understood and intuitive manner, and with adequate precision. Accordingly, the inventors have provided embodiments of improved methods and systems for defining NGZs for an autonomous mower.

BRIEF DESCRIPTION OF THE DRAWINGS

FIGS. 7A-7E depict illustrations of a user display during the method of FIG. 6.

DETAILED DESCRIPTION

Figure 3:
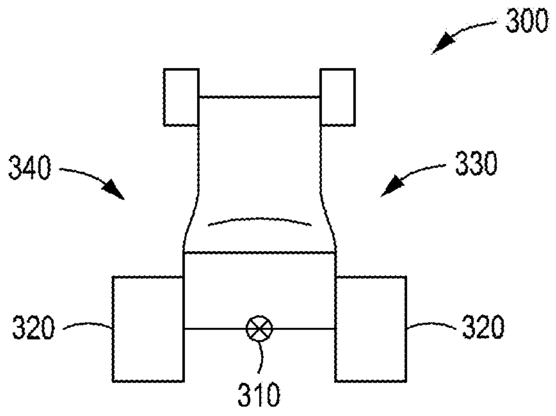
FIG. 3 is a schematic plan view of a mower in accordance with at least some embodiments of the present disclosure.

An autonomous mower 300 is schematically illustrated in FIG. 3 and may include several systems and capabilities to enable autonomous mowing. A perception system of the mower may include cameras and other sensors to detect and understand the surrounding environment. The perception system may be configured to identify, locate, and classify obstacles in its field of view. For example, the perception system may be configured to detect an object, determine its relative position from the mower, and classify the object as a tree. A localization system of the mower may be configured to determine the location of the mower at any given instant on a world or localized coordinate system. A planning system of the mower may be configured to determine a path that the mower should take in order to move the mower over a mow zone and cover the area of the mow zone completely with the mower deck such that all of the turf is cut. A locomotion system of the mower may be configured to receive input about obstacles from the perception system, location information from the localization system, and path information from a path planner of the mower, to follow the path, avoid obstacles, and cut all of the grass in the mow zone.

An exemplary autonomous mower, such as the mower outlined above, may employ an operator (e.g., a crew member of a landscape maintenance crew) to first establish a mow zone, which can be a bounded two-dimensional space that designates the area of turf the autonomous mower is assigned to cut. The mow zone may be rectangular, circular, or any shape as long as the mow zone is a bounded shape surrounded by and defined by a perimeter.

Setting a perimeter to define a mow zone can be done in several ways. One known way for defining a mow zone includes an operator manually controlling the mower in a recording mode and following a path that defines the perimeter of the mow zone. For example, if the perimeter of the mow zone is intended to be rectangular, the operator may engage a location recording mode on the mower and then manually direct the mower to follow along all four sides of the rectangle, returning to at least approximately the starting point where location recording began. A mow zone setting system may then use waypoints recorded along the path of the mower to define a continuous perimeter, and close the loop of the perimeter, if necessary to define a bounded space enclosed by the perimeter as the mow zone.

In addition to mow zones, it may be helpful to establish no-go zones (NGZs). A NGZ is also an enclosed space surrounded by a continuous perimeter. A NGZ may be added inside of a mow zone to designate a space that should not be mowed, or, in other words, to subtract from the area that should be mowed inside the mow zone. For example, a NGZ can be defined around a planter bed positioned inside of a mow zone to designate the planter bed as a space that should not be mowed. When the planner system of the autonomous mower plans a route for the mower, it will cover all the space within the mow zone that is not inside the NGZ. Defining a mow zone is known to be conducted with the same perimeter tracing and recording strategy mentioned above—the operator moving the mower, while in a recording mode, along a path that traces a perimeter of the NGZ, recording waypoints along the way.

Operators should be able to define mow zones and NGZs rapidly and efficiently. The methodology the operator is to follow should be easy to understand and intuitive. The methodology should result in adequate precision and predictability concerning where the perimeters will be located. Described herein are two methods that can be used to define mow zones and NGZs: herein referred to as "drive-to-teach" and "point-and-click."

Figure 1:
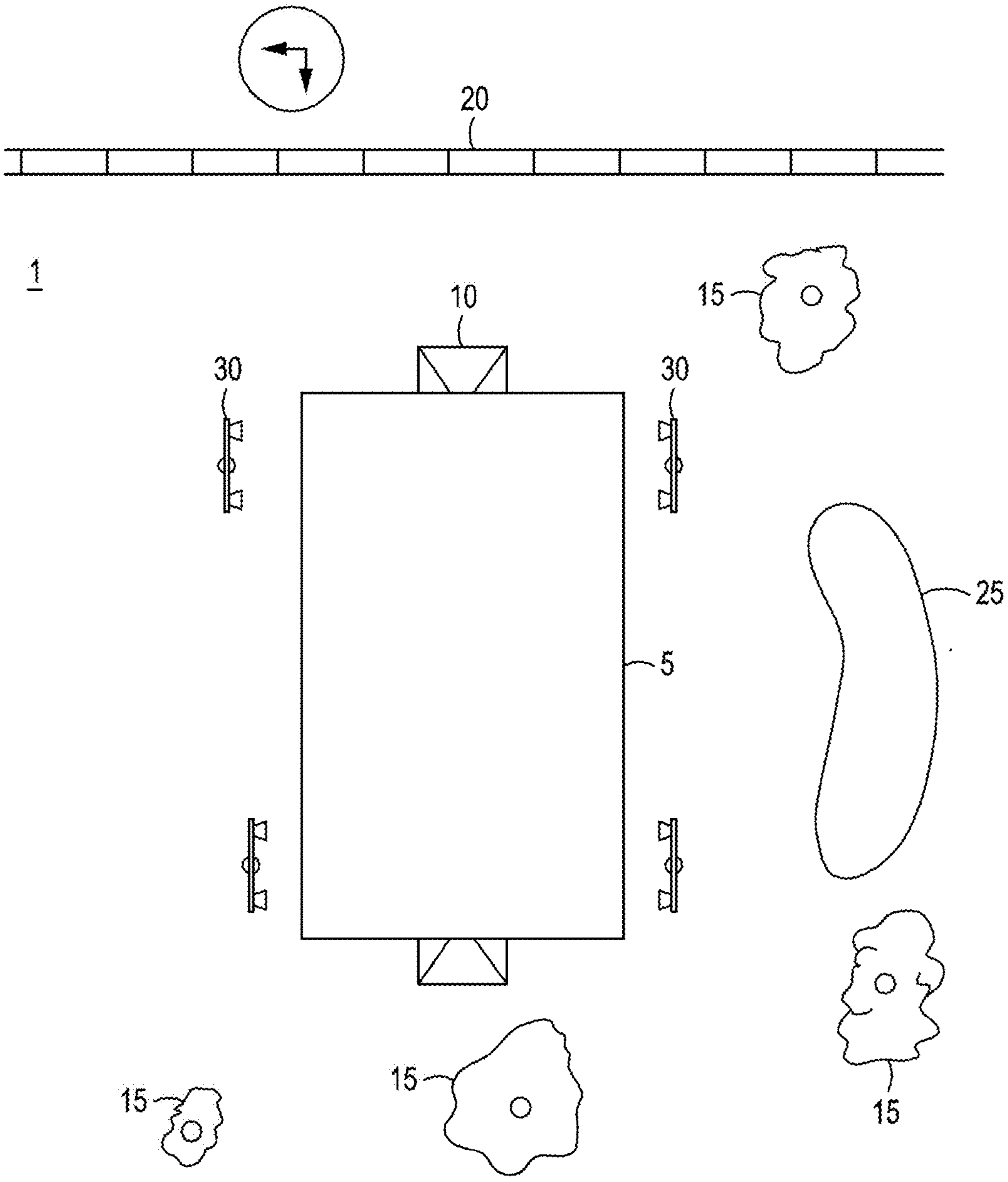
FIG. 1 is a schematic plan view of an exemplary property with obstacles.

FIG. 1 illustrates an exemplary property 1 that a landscape contractor or worker may be hired to maintain and which includes some areas that are suitable for autonomous mowing. The property 1 may include a soccer field 5 with goals 10, several trees 15, a sidewalk 20, a planter bed 25, and light poles 30.

Figure 2A:
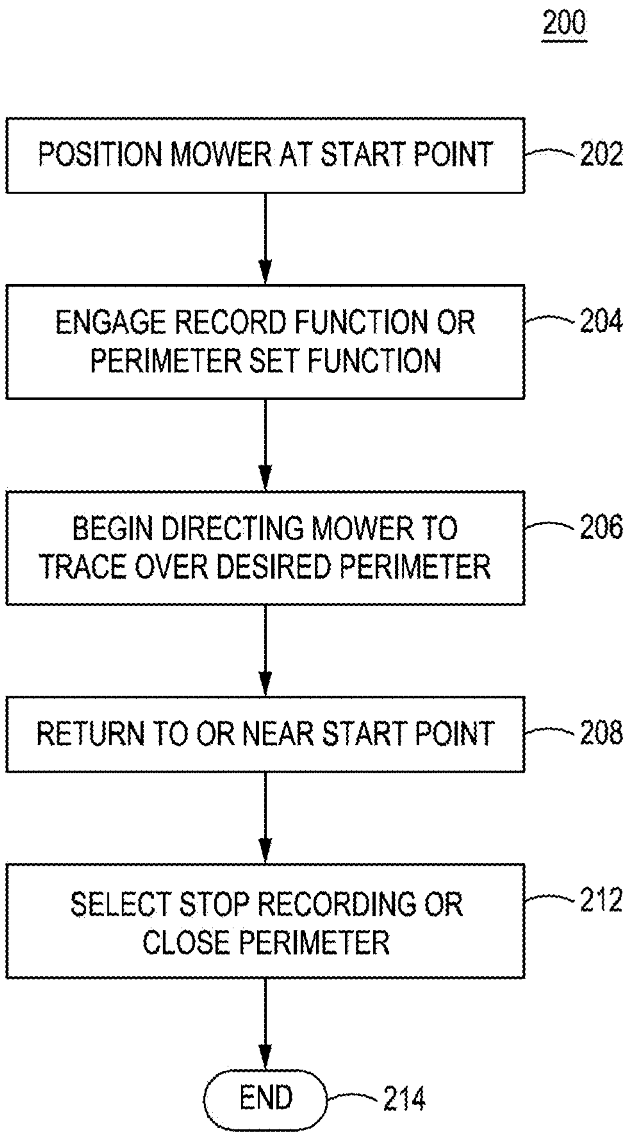
FIG. 2A illustrates a method of defining a mow zone and an NGZ in the exemplary property of FIG. 1.
Figure 2B:
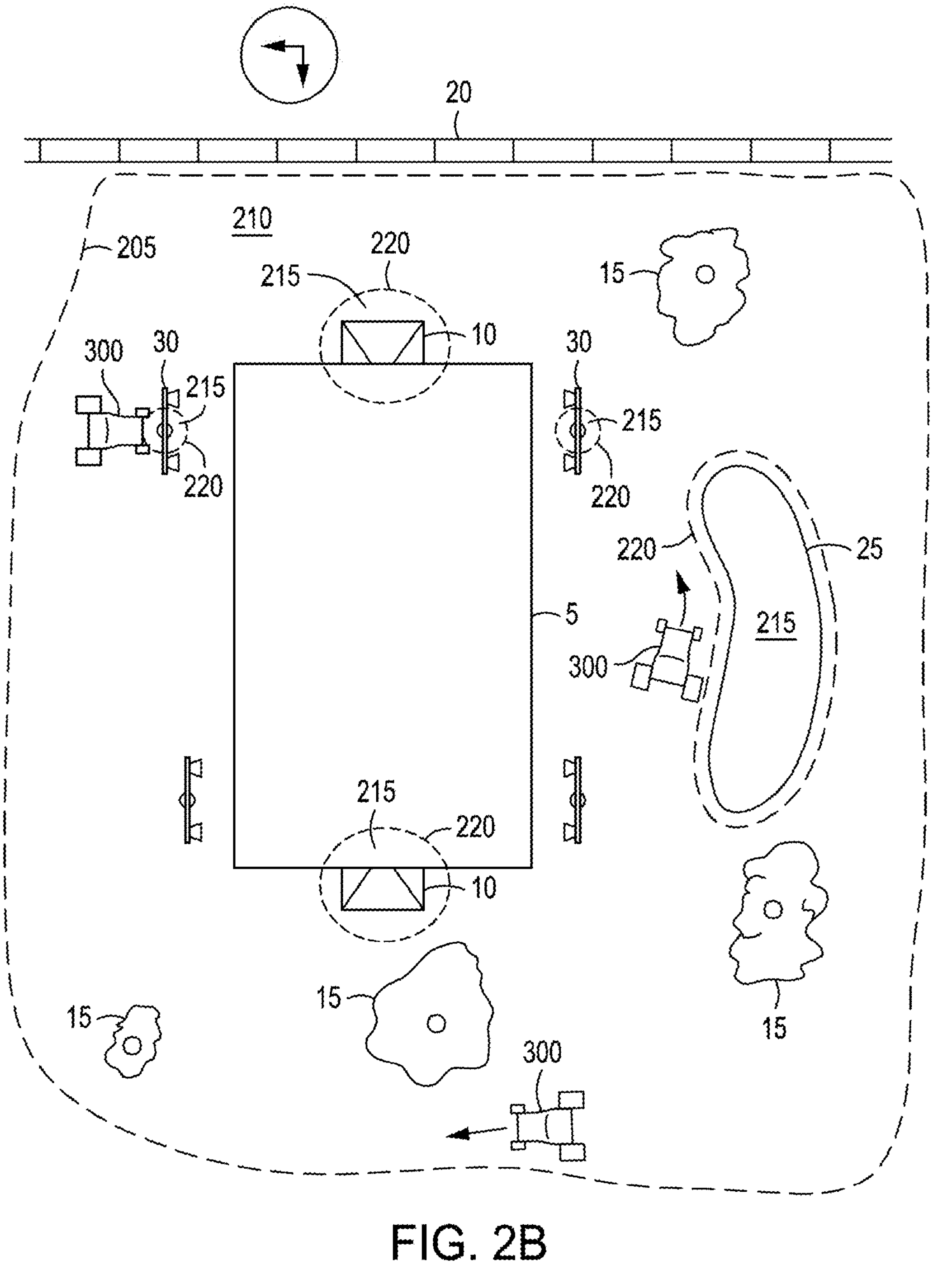
FIG. 2B shows a mower in the exemplary property of FIG. 1 performing the method described in FIG. 2A.

FIGS. 2A and 2B illustrate a method 200 of using the aforementioned drive-to-teach method for defining the perimeters 205 and 220 in the exemplary property 1. FIG.

2B shows the exemplary property 1 along with a schematic representation of an autonomous mower 300 in various positions while defining the perimeters 205 and 220. A perimeter 205 can be set to define a mow zone 210, which includes a portion of the property selected by the operator that is suitable for autonomous mowing. The autonomous mower 300 may be assigned to autonomously mow turf in the mow zone 210. Within mow zone 210, certain interior areas where mowing should not occur may be designated as NGZs 215 which are defined by perimeters 220. As shown in FIG. 2, perimeters 220 are shown surrounding the goals 10, the trees 15, the planter bed 25, and the light poles 30.

As shown in FIG. 2A, at block 202, the method 200 may begin with the autonomous mower 300 being operated manually by an operator in a known manner and having the operator position the mower 300 on a start point on the desired perimeter 205. At block 204, the method 200 includes the operator engaging a "record function" or "perimeter set function" on the mower. At block 206, the method 200 includes the user directing the mower 300 to trace over where the perimeter 205 is desired. The "record function" or "perimeter set function" records the position of the mower 300 while navigating, or tracing over the desired perimeter 205. Recording the position of the mower 300 could be accomplished in any known manner, such as by recording discrete waypoints at time intervals which are then joined together to form a continuous line for perimeter 205. At block 208, the method 200 includes navigating or tracing over the desired perimeter 205 and returning to or near the start point. At block 212, when the mower 300 is at or near the start point, the method 200 may include the user selecting a "stop recording" or "close perimeter" function, which may then check, using heuristics or other functions in a known manner, that the perimeter 205 is a continuous, closed perimeter, and can close the perimeter 205 between the start point and the end point if necessary, and make other corrections to form a relatively smooth, continuous perimeter 205, using any of several known methodologies. At block 214 the method 200 may end.

FIGS. 2A and 2B also illustrate using the method 200 to define certain of the perimeters 220 that define NGZs 215. For example, in FIG. 2B the mower 300 is positioned to record a perimeter 220 around planter bed 25. In a manner similar to the setting of perimeter 205 for mow zone 210, the operator positions mower 300 on some start point on the desired perimeter 220. The operator engages a "record function" or "perimeter set function" on the mower, and then begins directing the mower to trace over where the perimeter 220 is desired. The "record function" or "perimeter set function" records the position of the mower while navigating, or tracing over the desired perimeter 220. Recording the position of the mower 300 could be accomplished in any known manner, such as by recording discrete waypoints at time intervals which are then joined together to form a continuous line for perimeter 220. When the operator navigates or traces over the entire desired perimeter and returns to or near the start point, a "stop recording" or "close perimeter" function is engaged on the mower 300 which then checks, using heuristics or other functions in a known manner, that the perimeter 220 is a continuous, closed perimeter, and can close the perimeter 220 between the start point and the end point if necessary, and make other corrections to form a relatively smooth, continuous perimeter 220, using any of several known methodologies.

In some embodiments, the mower 300 may use its perception system to classify objects on the property 1 as the mower 300 traverses the property and may make recommendations to an operator to designate such classified objects as NGZs. For example, the mower 300 may sense and classify an object in property 1 as a tree 15, and, thus, an obstacle that should inside be an NGZ. The mower 300 may display a message to an operator of the mower, such as on a display 704 (FIG. 7A) of the mower 300, suggesting that the operator record an NGZ at the location of the classified tree. The operator may proceed to record an NGZ in the area of the tree 15 using any of the methods described herein.

When setting a perimeter, whether for a mow zone or a NGZ, it may be necessary to determine a point on or a point relative to some point of the mower 300 as the location where the waypoints should be recorded. One solution is to arbitrarily pick a base point on the mower 300 as the reference point for recording waypoints. For example, as shown in FIG. 3, a base point 310 on the mower 300 that is midway between the center of the two rear drive wheels 320 could be picked as the reference location for all waypoints. As the mower 300 moves around, the waypoints may be recorded as the position of the base point 310 at the given time when the waypoint is recorded.

To better represent the intent of the operator when establishing a perimeter, the final recorded perimeter may be offset, to one side or the other, from the series of waypoints. When mowing the mower around to trace an enclosed space (such as when tracing perimeter 205 or 220), one side of the mower 300 will be the interior side 330 of the mower 300 and an opposite side of the mower 300 will be the exterior side 340. If tracing the perimeter 205 or 220 in a clockwise fashion (when viewed from a bird's eye view), the interior side will be on the right side of the mower 300, and the exterior side on the left side as shown in FIG. 3. If tracing the perimeter 205 or 220 in a counterclockwise fashion, the interior side will be on the left side of the mower 300, and the exterior side will be on the right side. The interior side is closest to the enclosed space of the mow zone 210 or space of the NGZ 215, and the exterior side is further away.

Explained another way, a line drawn from the center of the mower 300 through the interior side will point towards the enclosed space of the mow zone 210 or NGZ 215, and a line drawing from the center of the mower through the exterior side will point away from the enclosed space of the mow zone 210 or NGZ 215. In the case of a mow zone 210, the operator will wish for the exterior side 340 of the mower 300 to essentially define the perimeter 205 and extent of a mow zone 210 so that while tracing the perimeter 205, the area mowed or traversed will be included in the enclosed space of the mow zone 210. To illustrate, when the operator defines the portion of the perimeter 205 adjacent to the sidewalk 20, the expectation of the operator will be that the mow zone 210 extends right up to the edge of sidewalk 20. When setting the perimeter 205, it will be most convenient for the operator to drive the mower 300 such that the exterior side of the mower 300 is cutting that boundary between sidewalk 20 and turf, rather than positioning the middle of the mower 300 on top of that boundary between sidewalk 20 and turf. Thus, the recorded waypoints should be offset toward that exterior side 340 when finally defining a perimeter 205 of the mow zone 210. Of course, rather than recording waypoints corresponding to one location, and then offsetting those waypoints toward the interior or exterior of the mower to finally define a perimeter, the waypoints can be recorded initially based on an offset position toward the interior or exterior.

An algorithm may be used to determine the offset of the waypoints before finally setting the perimeters 205, 220. The algorithm may determine the offset direction based on various factors including an indication from the user as to what type of perimeter (mow zone or NGZ) is being defined during recording. For example, the pose of the mower 300 may be recorded with the tracked locations of the waypoints to determine whether the mower is traveling clockwise or counterclockwise from a start position to a final position. Then, by knowing the intended perimeter is either for a mow zone or an NGZ, the mower can determine which side of the mower 300 is an interior side or exterior side for purposes of defining the perimeters 205, 220. Then, the recorded waypoints may be offset towards the relevant side. For example, in FIG. 2B, the mower 300 is shown traveling in a clockwise direction to record waypoints for perimeters 205 and for perimeter 220 around the flower bed. However, when the operator travels to define perimeter 205, the operator indicates that the perimeter is intended to define a mow zone. Therefore, the algorithm may determine from the directionality and purpose of the recording that the way-points to finally record for defining the perimeter 205 should be on the exterior side 340 of the mower 300 shown in FIG. 3. In the case of perimeter 205 in FIG. 2B, if waypoints are recorded at base 310 of the mower 300, then an offset or transposition may be made to the waypoints before finally setting perimeter 205. In this case, the offset or transposition may be toward the exterior side 340 of mower 300 so that the area mowed or traversed by the mower when establishing perimeter 205 is included in the enclosed space of mow zone 210.

On the other hand, when the operator travels to define perimeter 220, the operator may indicate that the perimeter is intended to define an NGZ. Therefore, the algorithm may determine from the directionality and purpose of the recording that the waypoints to finally record for defining the perimeter 220 should be on the inside of the mower 300. In the case of perimeter 220 in FIG. 2B, if waypoints are recorded at base 310 of the mower 300, then an offset or transposition may be made to the waypoints before finally setting perimeter 220. In this case, the offset or transposition may be toward the interior side 330 of mower 300 so that the area mowed or traversed by the mower when establishing perimeter 220 is not included in the enclosed space of NGZ 215.

Figure 4:
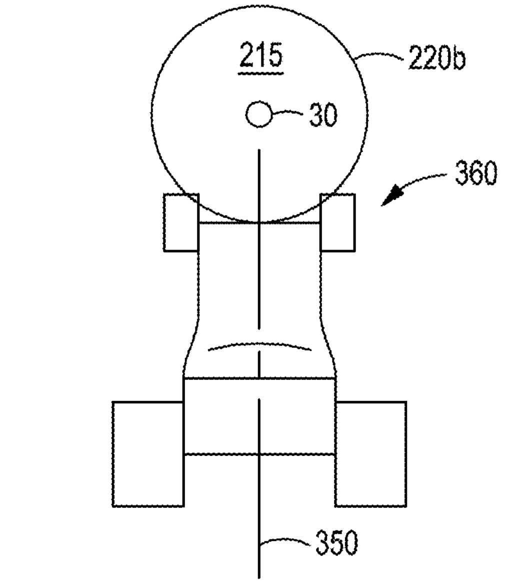
FIG. 4 shows the mower of FIG. 3 in a first stationary pose near a tree while establishing an NGZ.

FIG. 4 illustrates a point-and-click method for establishing and setting a NGZ 215. In this case, the operator positions mower 300 such that the forward direction of the mower 300 is pointed at the obstacle (or area to be avoided for mowing), illustrated in FIG. 4 as light pole 30 from FIG. 2B, and the mower 300 is positioned typically a few feet away from the obstacle. The operator can then enter into a procedure enabled by mower 300 to establish a perimeter **220*b* around light pole 30, the perimeter 220*b* defining a NGZ 215. The procedure may be performed while the mower is in a stationary pose with respect to the obstacle. As part of the procedure, the operator selects the characteristics and position of the NGZ 215 relative to mower 300. As one example shown in FIG. 4, the operator can select a NGZ 215 that is circular in shape, about 4 feet in diameter, and positioned such that the center of the circle is positioned on the centerline axis 350 of mower 300 at about one radius away (2 feet) from the front 360 of the mower 300**.

This point-and-click method for setting NGZ 215 illustrated in FIGS. 2B and 4 may be preferable in some situations to a method, such as method 200, that requires driving the mower 300 to trace the perimeter 220. When a perimeter 220 of an NGZ will be relatively small, navigating the mower 300 around a tight perimeter can be more difficult. The point-and-click method 400 is also relatively quick and intuitive for the operator.

Figure 5:
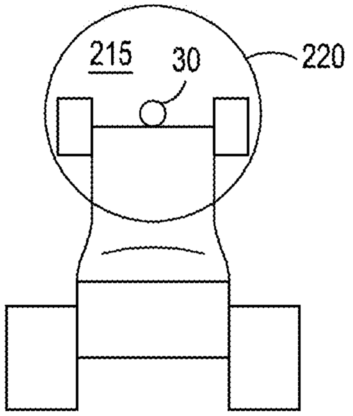
FIG. 5 shows the mower of FIG. 3 in a second stationary pose near the tree while establishing an NGZ.

The point-and-click method for setting NGZ 215 illustrated in FIGS. 2B and 4 may also include options to establish an NGZ 215 of different sizes, shapes, and positions relative to the mower 300. For example, in FIG. 5, NGZ 215, still circular in shape, has been selected by the operator to be positioned such that the center of the circle is on or closely positioned in front of the mower 300 and is on the mower centerline axis 350. This may be a preferred option for an operator when the obstacle, such as light pole 30, can be approached very closely and even bumped against with the front 360 of mower 300, and will help ensure that the NGZ 215 is very closely centered on the obstacle.

Other possibilities for the operator to select could include different shapes for an NGZ 215, including square, or oval, etc. The method could also permit a variety of positions for the NGZ 215 relative to mower 300, including an NGZ 215 that is centered around the center of the mower 300, or offset to the right or left side, or centered around a right front wheel or left front wheel, etc. Providing multiple options could allow the operator to pick the most intuitive or accurate option for positioning a particular NGZ 215.

Figure 6:
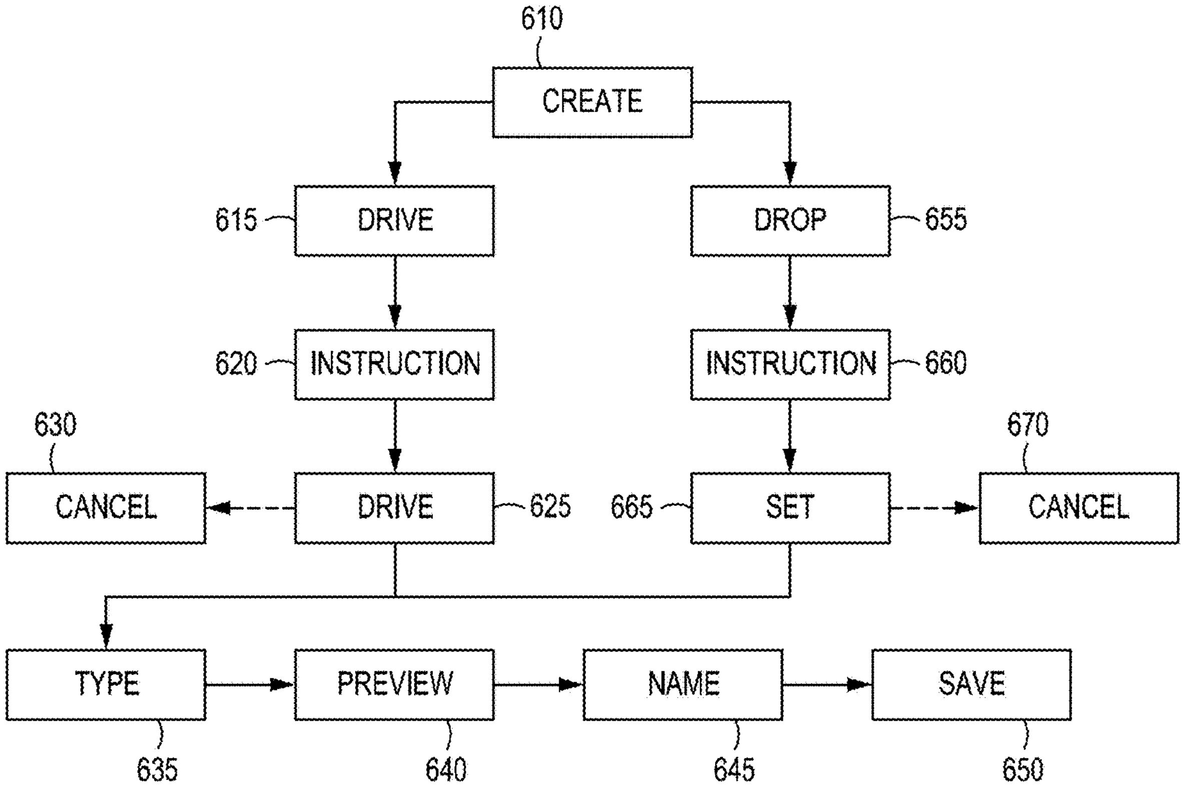
FIG. 6 illustrates a method of defining NGZs in accordance with at least some embodiments of the present disclosure.

FIG. 6 illustrates a user interface workflow 600 for a user to instruct and interact with mower 300 to establish NGZs 215. Of course, other processes are possible or could be adapted by those of skill in this art to suit different situations or mowers. At step 610, the NGZ creation process is launched by the user selecting a button (e.g., button 702 in FIGS. 7A and 7C) on a display (e.g., display 704 in FIGS. 7A-7E) on the mower 300 or through other similar action. The display 704 may be a human machine interface (e.g., touch screen). Other or additional interfaces may be used such as a mouse, joy stick, smartpen/stylus, as well as physical buttons (e.g., keyboard) may be used for point and clicking for defining a NGC. At this step, the option to establish the NGZ through either a drive-and-teach method or a point-and-click method is selected by the operator, as shown, for example, in FIGS. 7A and 7B. If the operator selects drive-and-teach at step 615 (as shown in FIG. 7A), then instructions for conducting this method may be displayed on the display (as shown in FIG. 7B) at step 620. At step 625 the operator drives around to trace the desired perimeter 220 as has been described above while the path is recorded by the mower, such as by recording waypoints. At any point during such process the operator can select a cancellation option 630 (e.g., using cancel button 710 shown in FIG. 7B). If the recordation of the perimeter 220 is completed, for example by the operator reaching an end point of the tracing of the desired perimeter and selecting a "done" button (e.g., button 706 in FIG. 7B) or the like on the display 704, then at 635 the operator can select (e.g., using a drop-down list in FIG. 7B) a type of NGZ 215 to associate with the NGZ 215 that is being defined. The type could correspond to the type of obstacle that the NGZ 215 is created for, such as a boulder, pole, planter bed, tree, etc. At 640 the display (e.g., display 704) on mower 300 could then display a representation of the NGZ 215, including an indication of the selected type through text, coloring, cross-hatching, etc., as shown, for example, in FIG. 7E. At 645 the operator could be prompted to give the NGZ 215 a name to help in future identification and understanding of the property. At 650 the operator could be prompted to select a "save" or similar button (e.g., save button 708 in FIG. 7E) on the display 704 to complete the process and record the NGZ 215.

If, at the beginning of the workflow 600, the user instead selects a point-and-click method (as shown in FIG. 7C) for defining the NGZ 215 at step 655, then at step 660 instructions for utilizing this method can be displayed on the display 704 of mower 300, as shown in FIG. 7D. At step 665, the user will navigate the mower 300 to near where the NGZ 215 is to be located and establish a position and shape for the NGZ 215 as has been previously described above with respect to the description of the point-and-click method illustrated in FIGS. 2B, 4, and 5. The perimeter shapes presented as options to the user on the display 704 may include suggested shapes like circles, squares, rectangles, ovals, or triangles. In some embodiments, the shapes may be customized by a user to fit a specific perimeter shape by permitting the user to dynamically pinch to adjust the perimeter shape to fit. For example, if a desired perimeter is rectangular, a user may select a square shape and use his fingers on the display to stretch vertices of the square to redraw it as a rectangle. At any point during this process, the user can decide to cancel the process at step 670 by pressing a "cancel" button (e.g., cancel button 710 in FIG. 7D) or the like on the display 704 of the mower 300. After the position, shape and other attributes of an NGZ 215 are set according to this method, such as by the user interacting with the display screen as shown in FIG. 7D, the operator can be prompted at step 635 to select a type for the NGZ 215. From this point forward, the user interaction process proceeds as previously described for the drive-and-teach method.

Having both the drive-and-teach and the point-and-click methodologies for establishing an NGZ is advantageous for the operator. Each method is intuitive to follow, but each one is more suited to different sizes and positions and details of different NGZs. Point-and-click can be fast and can work very well for small NGZs that are desired to have a geometric shape like a circle or square. Drive-and-teach can work well for NGZs that are large and randomly or non-geometrically shaped.

Although the methods described above have been described in conjunction with the use of a mower, such as autonomous mower 300, it will be appreciated that the methods are not intended to be so limiting. In some embodiments, instead of using a mower to define perimeters of mow zones and NGZs, a user may use a mobile package of sensors (e.g., IMU and GNSS sensors) that mimics the functionality of the mower 300 described herein for purposes of defining perimeters for mow zones and NGZs. The mobile package may be manually or remotely movable by an operator. For example, the mobile package may be in the form of a portable computer system, such as a tablet computer or smart phone. Also, for example, the mobile package may be in the form of a backpack worn by a user with sensors and instrumentation that mirror the functionality of the mower 300. The mobile package of sensors may also be a motorized or unmotorized wheeled cart or vehicle, for example.

Figure 8:
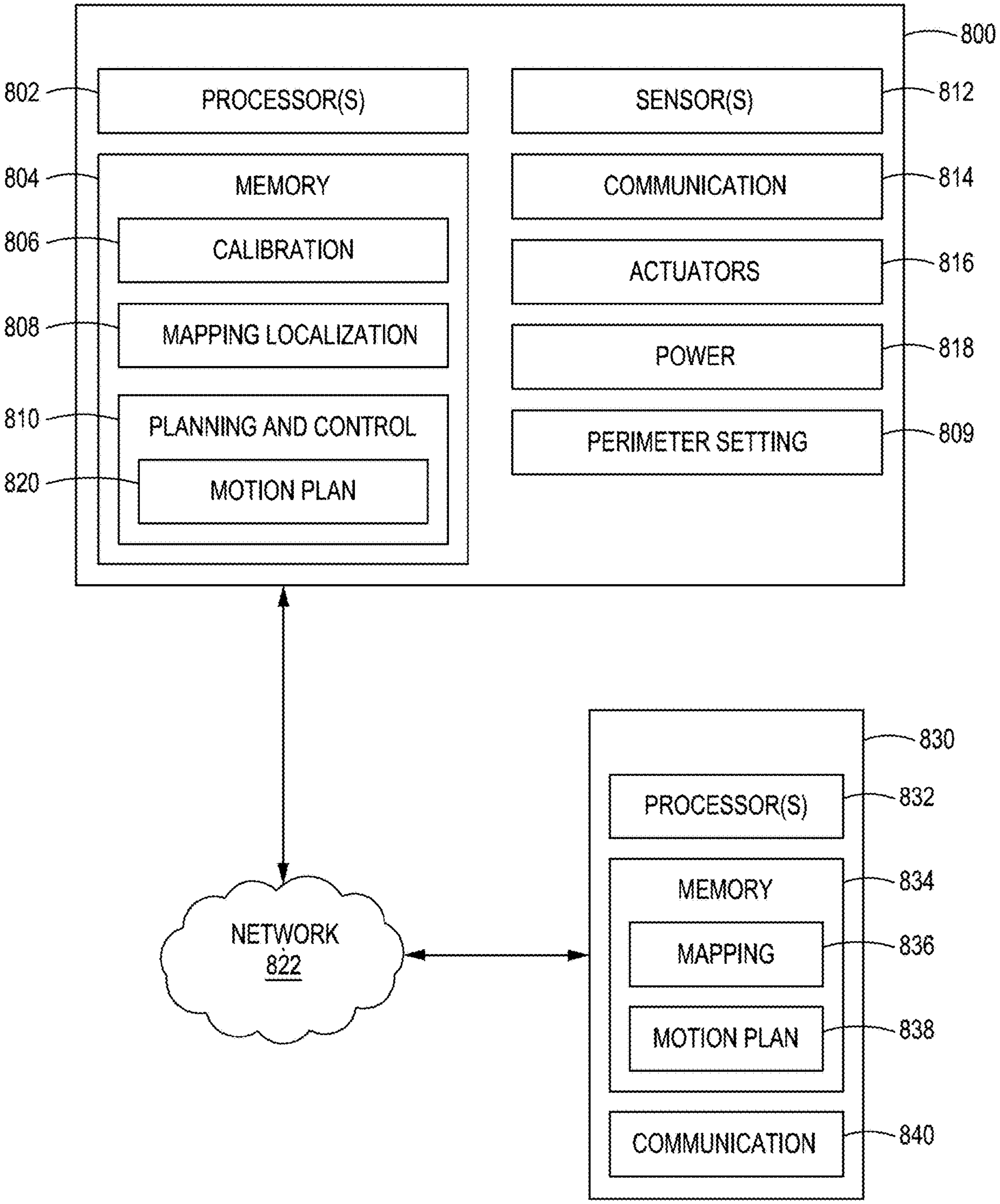
FIG. 8 depicts a schematic of a system in accordance with at least some embodiments of the present disclosure.

FIG. 8 is an example system 800 capable of performing the operations described herein. Such a system 800 may comprise one or more of processors 802, memory 804, sensor(s) 812, communication subsystem 814, actuators 816, and power system 818. Further, though depicted in FIG. 8 as a single system 800 for illustrative purposes, the intention is not to be so limiting. For example, the system 800 may be a distributed system (either locally or non-locally), where each block may be present on (or performed by) a remote system. Further, though particular blocks are associated with individual systems or subsystems, the description is not meant to be so limiting. Indeed, any block may be present in any one or more of the systems or subsystems illustrated in FIG. 8 (or not present at all). Also, the system 800 may be connected to a server 830 through a network 822.

The system 800 may include one or more processor(s) 802, any of which may be capable of performing the operations described herein. In some examples, the processor(s) 802 may be located remotely from the system 800, such as processors 832 located on server 830. The one or more processor(s) 802 may comprise one or more central processing units (CPUs), one or more graphics processing units (GPUs), digital signal processors (DSPs), field programmable gate arrays (FPGAs), application specific integrated circuits (ASICs), or the like. In one example, the system 800 may include a model Jetson Xavier computing module available from Nvidia Corporation.

Memory 804 is an example of one or more non-transitory computer readable media capable of storing instructions which, when executed by any of the one or more processor(s) 802, cause the one or more processor(s) 802 to perform any one or more of the operations described herein (e.g., those described in reference to any of FIG. 1-5). The memory 804 can store an operating system and one or more software applications, instructions, programs, and/or data to implement the methods described herein and the functions attributed to the various systems. In various implementations, the memory 804 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 804 is capable of storing raw sensor data from the one or more sensor(s) 812, compressed or downsampled sensor data, output (or intermediate representations) of one or more machine learning models (e.g., feature maps of neural networks), and/or representations of the raw sensor data. Memory 834 on server 830 may store some or all of the data described above that is stored in memory 804.

Sensor(s) 812 may comprise one or more image sensor(s), radar(s), lidar(s), ultrasonic(s), touch sensors, Global Positioning and/or Navigation Satellite Systems, inertial measurement units (IMUs)—which may comprise one or more accelerometers, gyroscopes, and/or magnetometers, and the like, encoders (which may be associated with any one or more wheels or one or more blades), orientation sensors, Hall sensors, ammeters, voltmeters, power meters, location systems, battery management systems, motor sensors, etc. Image sensors may comprise, for example, RGB cameras, intensity cameras (e.g., greyscale or monochrome), stereo cameras, depth cameras (e.g., structured light sensors, time of flight (TOF) cameras, etc.), RGB-D cameras, infrared cameras, ultraviolet cameras, hyperspectral cameras, and the like. In those examples where multiple image sensors are contemplated, various image sensors may have varying fields of view. For example, where at least two image sensors are used, one image sensor may be a narrow field of view camera and the other a wide-angle field of view camera.

Sensor(s) 812 may further include, for example, ultrasonic transducers (e.g., SONAR), thermal imaging sensors (e.g., infrared imagers), non-contact temperature sensors (e.g., sensors capable of determining the temperature of a surface), ambient light sensors (e.g., light sensors such as, but not limited to, photodiodes capable of determining an intensity of light at 800-1200 nm), humidity sensors, pressure sensors, bolometers, pyrometers, wind speed sensors, and the like. Sensor data from such other sensors may be used to generate three-dimensional maps and/or localize the system 800, such as in mapping/localization component 808. Any of the one or more sensor(s) 812 may also be associated with a timestamp including, but not limited to, a time of day, time of month, and/or time of year (e.g., Jan. 16, 2018 4:50 am UTC).

Sensors(s) 812 may also comprise a deck sensor comprising at least one sensor for determining a height of the blades relative to the grass and/or the chassis (e.g., a Hall effect sensor), and/or at least one sensor for measuring blade rotation parameters such as RPM, velocity, torque sensor or the like.

Such an example system 800 as shown in FIG. 8 may additionally or alternatively comprise one or more communication subsystems 814. An example communication subsystem 814 may be used to send and receive data either over a wired or wireless communication protocol, as well as provide data connectivity between any one or more of the processor(s) 802, memory 804, and sensors 812. Such protocols may include, but are not limited to, WiFi (502.11), Bluetooth, Zigbee, Universal Serial Bus (USB), Ethernet, TCP/IP, serial communication, cellular transmission (e.g., 4G, 5G, CDMA, etc.) and the like. As indicated herein, such a communication subsystem 814 may be used to send data (e.g., sensor data, control signals, etc.) to other systems (e.g. cloud-based computers, etc.). In at least some examples, to minimize an amount of data transferred (as raw sensor data may amount to upwards of multiple gigabytes to multiple terabytes per day), raw sensor data from the one or more sensors 812 may be downsampled or compressed before transmission. In at least one example, sensor data (whether raw, compressed, downsampled, a representation thereof, or otherwise) may be automatically uploaded to another computing device when in a particular location (e.g., when in a shed, or other preselected user location). Representations of data may include, for example, averages of the data, feature maps as output from one or more neural networks, extracted features of the data, bounding boxes, segmented data, and the like.

The system 800 may comprise actuator(s) 816, such as, but not limited to, one or more motors to provide torque to one or more drive wheels (e.g., 320) associated with the system 800, a deck actuator to raise and lower a blade platform or deck (though any other actuator is contemplated), one or more motors to spin associated one or more blades for cutting, one or more brakes associated with the one or more wheels, and the like. Such actuators may further comprise, for example, electric and/or mechanical motors, hydraulics, pneumatics, and the like. Upon receiving a signal from one or more of the planning and control subsystem 810, at least a portion of the actuator(s) may actuate in order to effectuate a trajectory (steering, acceleration, etc.), release fertilizer, seed, herbicide, pesticide, insecticide, seed, etc., and the like.

In one example, the drive motors may be one or more brushless DC motors, permanent magnet AC motors, AC induction motors, switched reluctance motors or the like. The motor controller circuits (power switching) may be separate from the motors or built into the motors. In one example, the motor controllers may operate on the Field Oriented Control (FOC) principle, a technique that allows a brushless motor to operate at very high efficiency. The motor controllers may use a three-phase half-H inverter design utilizing N-channel MOSFETs (e.g., SiC FETs or IGBTs). The motor controllers may utilize rotor feedback to facilitate accurate FOC motor control via encoders (e.g., inductive, optical, magnetic, or conductive), resolvers, Hall effect sensors, or "sensorless" through back EMF measurements from the motors themselves.

The actuator(s) for spinning the blades may be, for example, a brushless DC motor rotating the blades at, for example, about 1000 RPM up to about 5000 RPM when operating nominally. The deck actuator may comprise one or more linear actuator such as solenoid(s), ball screw(s), rack and pinion assembly(ies), hydraulic/pneumatic piston, or the like.

The actuator(s) 816 may further comprise a brake system. Such a brake system may be electronically controlled to perform braking and/or a brake assembly may be coupled to each motor to slow the rotation of each wheel independent, when braking is used to steer the mower, or slow rotation of both drive wheels 114(*a*), 114(*b*) simultaneously, when front wheel steering is used to steer the mower. In one example, the control subsystem 810 may use a friction-based braking system with friction pads (either disk, drum, or clutch style brakes) that are coupled to a motor shaft, either before or after a transmission or other gearing that may form part of each motor. The braking system may be electromagnetically actuated via a solenoid, linear actuator or other electric-motor driven mechanism. Using such a braking system enables the mower to be held at zero velocity when the mower is not being commanded to move. In addition, a friction based braking system saves power and prevents runaway mowers in the event of emergency stops or system failure. In addition to, or in lieu of, the friction braking system, the control subsystem 810 may utilize regenerative braking through control of the drive motors. In one example, regenerative braking is used for non-emergency braking during normal operation and friction braking is used during emergency stops and parking. With regenerative braking, energy from mower inertia is either transferred into the battery(ies) and/or into a brake resistor.

System 800 may also comprise a power system 818 including, but not limited to one or more of batteries, battery packs, fuel cells, super capacitors, or otherwise to provide power to the one or more processor(s) 802, actuators 816, sensor(s) 812, or any other component or subcomponent of the system 800 which requires power. The power system 818 may be removable such that the power system 818 can be removed and replaced when not operating within norms, e.g., recharge capacity is below a capacity threshold. The power system 818 may include multiple energy sources such as a battery or fuel cell for powering the mower electronics and a tank for gasoline, natural gas, hydrogen, or other fuel for powering one or more motors.

Though not illustrated for clarity, the system 800 may comprise one or more support circuits which may comprise circuits and devices that support the functionality of the processor(s) 802. The support circuits may comprise, one or more or any combination of: clock circuits, communications circuits, cache memory, power supplies, interface circuits for the various sensors, actuators, and communications circuits, and the like. More specifically, the support circuits may comprise sensor interfaces, communication circuit(s) interfaces, and actuator drive interfaces. The sensor interfaces may support data transfer from the sensor(s) 812 to the processor(s) 802 through one or more, or any combination of, data buffering/caching, signal digitizing, signal amplification, digital and/or analog signal processing, filtering, limiting, and/or the like.

The communication circuits interfaces may support data transfer to/from the communications circuits (e.g., LTE and/or WiFi transceivers) to/from the processor(s) 802 through one or more, or any combination of, digital and/or analog signal processing, filtering, limiting, amplifying, and/or the like. The communications circuits may comprise one or more communications transceivers (modems) and their associated antennas. In some examples, the communication circuits may include, but are not limited to, a pair of WiFi transceivers, a pair of LTE transceivers, or the like. The antennas generally may include a plurality of antennas to ensure diverse antenna positioning on the mower body to combat multi-path interference. A pair of transceivers may be used to provide redundancy. For example, two antennas for each transceiver (eight antennas total) may be mounted on either side of the body 102(*a*). The antennas for LTE/WiFi and GNSS may be collocated in a single antenna housing (dome). The server 830 may have a communication module 840 configured to facilitate communication between the system 800 and server 830 through the network 822.

The actuator drive interfaces may support control of the actuators 816 (e.g., drive motors, brake system, blade motors, deck actuator, etc.) through one or more, or any combination of, current, voltage or pulse width modulated signal controllers in the form of motor controllers, brake controllers, solenoid controllers and/or the like.

Within memory 804, a calibration component 806 may perform calibration of the one or more sensor(s) 812 and/or actuators 816. Calibration may comprise determining one or more sensor intrinsics and/or extrinsics, as well as determining positions of components or subcomponents (e.g., blade height), applied torques relative to currents applied, and the like. Such calibration protocols performed by calibration component 806 may ensure that any one or more components or subcomponents of system 800 is working properly and enable correct calculations to be generated given the system's 800 current understanding of the relative positions, orientations, and parameters of the other components and subcomponents.

A mapping/localization component 808 may take in sensor data from any one or more of the sensor(s) 812, in addition to any one or more outputs from the calibration component 806 to one or more of map an area and/or provide a position and/or orientation of the system 800 relative to the map. In at least one example, sensor data from the one or more sensor(s) 812 may be used to construct (and/or update) a two- and/or three-dimensional map of the scanned area. When updating, preexisting map data may be received from memory 804 and/or from mapping data 836 in memory 834 of server 830. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map may be stored as a signed distance function (SDF), or truncated SDF (TSDF), triangle mesh, mosaics, etc. Use of voxel hashing may improve memory requirements for both storage and raycasting. In at least some examples, sensor data may include radar data indicative of subterranean objects (e.g., pipes, golf balls, rocks, etc.). Such subterranean objects may provide features for use in creating the map. For example, locations of sprinklers, piping, rocks, moisture levels, and the like may be combined (or fused) with other sensor data to both generate the maps and localize against them.

Furthermore, various combinations of sensor data may be used to provide additional insight as derived sensor data. As a non-limiting example, sensor data from wide-angle, dual baseline, image sensors may be used to reconstruct depth of the environment and provide additional features for use in generating the map and or localizing the system 800 against such a map. Any such derived sensor data may be either used for mapping and/or localization, as well as may be associated with the map after it has been generated (e.g., storing the value associated with the portion of the map where the data was collected). Further, in at least some examples, control signals (as may be received and/or generated by system 800) may be associated with the map at mapping and localization component 808. In some examples, GNSS data may be used to inform a Region of Interest (ROI) of satellite imagery to download to, or otherwise augment, the two- or three-dimensional map. Additionally, or alternatively, such a system 800 may download, or otherwise access, weather data as additional sensor data. The weather data may be indicative of, for example, weather conditions for the time of day associated with the other sensor data.

Such maps may comprise signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (growth, absence of growth, presence of pests, presence of weeds or invasive species, etc.), thermal data, ambient light data, etc. may be associated with every location in the three-dimensional map. Additionally, or alternatively, image sensor data (e.g., color) may be associated with the map as well (e.g., by weighted averaging, or the like), so that a user viewing the map would quickly see a virtual representation of the scanned area, including color.

A perimeter setting component 809 may receive data obtained from the operator according to the drive-and-teach or point-click-methods described herein. For example, the perimeter setting component 809 may receive data input by an operator using an interface of the mower 300, such as a touch display (e.g., display 704) to designate perimeters to define mow zones and NGZ. The mow zones may be used by the mapping component 808 and the planning and control component 810 to generate maps and coverage plans for routing a mower within the mow zones.

The planning and control subsystem 810 may determine commands for operating one or more of the actuator(s) 816. In some examples, such a planning and control subsystem 810 may determine one or more trajectories for the system 800 to follow (e.g., by determining a series of steering commands, acceleration commands, etc. which cause the system 800 to follow an intended pattern). Such trajectories may be determined in accordance with waypoints (e.g., GNSS-based waypoints) as may be received from a user via control interface (e.g., display 704) and/or calculated to optimize (e.g., minimize) a length of travel over a defined region of interest (e.g., as may be determined by motion planner 838 on server 830), a quality of cut, or a time to mow an area, for example. In various examples, one or more of the waypoints and/or trajectories may be based at least in part on a motion plan received from one or more of motion planner 820 or motion planner 838.

Motion planners 820 and 838 may determine the trajectories and control torques to drive wheels of the system 800 in accordance with the methods of motion planning described herein. Thus, in examples, the motion planners 820 and 838 may receive path information and waypoints for movement of the system 800 and determine a set of control torques for the first and second drive wheels to control the system 800 to move between a first point of the pair and a second point of the pair. The motion planners 820 and 838 may determine how to apply the set of control torques to the first and second drive wheels to move the system 800 along the path.

In any such example provided herein, such trajectories and/or controls may be calculated iteratively (and/or periodically) such that the system 800 (and/or associated user(s)) always has the most relevant information.

Multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the systems, techniques, and processes presented herein. Such systems, techniques, processes, etc. are not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g., A, AB, AB, ABC, ABB, etc.). When "and/or" is used, it should be understood that the elements may be joined in the alternative or conjunctive.

Example Clauses

A. A method for defining a no-go zone for an autonomous mower, the method comprising:
positioning the autonomous mower in a stationary pose, having a position and an orientation, near an area to avoid mowing; and
while the mower remains in the stationary pose, using the position and the orientation to set a perimeter bounding the area to avoid, wherein the perimeter defines the no-go zone for the autonomous mower.

B. The method of clause 1, wherein setting the perimeter includes selecting a size of the perimeter.

C. The method of clause A or B, wherein setting the perimeter includes selecting a position of the perimeter relative to the stationary pose.

D. The method of any one of clauses A-C, wherein the perimeter corresponds to a series of GPS coordinates.

E. The method of any one of clauses A-D, wherein positioning the autonomous mower includes pointing a forward direction of the autonomous mower at the area to avoid.

F. The method of any one of clauses A-E, wherein setting the perimeter includes selecting a shape of the perimeter.

G. The method of any one of clauses A-F, further comprising displaying the perimeter and obstacle in a display associated with the autonomous mower.

H. The method of any one of clauses A-G, wherein setting the perimeter includes selecting an obstacle or area type associated with the no-go zone.

I. The method of any one of clauses A-H, wherein storing the set perimeter includes storing a name associated with the no-go zone.

J. The method of any one of clauses A-I, wherein setting a perimeter includes inputting setting commands through a human machine interface on the autonomous mower.

K. The method of clause J, wherein the human machine interface includes at least one of a touch screen, a mouse, a joy stick, a smartpen/stylus, or a physical button.

L. A method for defining a mow zone and a no-go zone for an autonomous mower, the method comprising:
positioning the autonomous mower at a start point on a desired perimeter around an area to be mowed;
starting perimeter recording;
directing the autonomous mower to trace around the area to mow while recording positions of the autonomous mower;
stopping recording when the autonomous mower returns to or near the start point;
storing the recorded positions of the autonomous mower as a first perimeter defining a mow zone;
positioning the autonomous mower in a stationary pose having a position and an orientation, near an area to avoid mowing;
while the mower remains in the stationary pose, using the position and the orientation to set a second perimeter bounding the area to avoid mowing, wherein the second perimeter defines a no-go zone for the autonomous mower; and storing the set perimeter as the no-go zone.

M. The method of clause L, further comprising before storing the recorded positions, checking that the first perimeter is a continuous, closed perimeter.

N. The method of clauses L or M, further comprising closing the first perimeter between the start point and an end point when the checked first perimeter is not continuous.

O. The method of any one of clauses L-N, wherein navigating the autonomous mower includes manually navigating the autonomous mower.

P. The method of any one of clauses L-O, wherein the recorded positions of the autonomous mower includes a plurality of waypoints at time intervals joined together to form a continuous line.

Q. The method of clause P, wherein the waypoints are measured with respect to a reference point on the autonomous mower.

R. The method of clause P, further comprising before the storing, offsetting the first perimeter to one side of the plurality of waypoints.

S. The method of any one of clauses L-R, further comprising displaying the second perimeter and area to avoid in a display associated with the autonomous mower.

T. The method of any one of clauses L-S, wherein storing the second perimeter includes storing an obstacle or area type associated with the no-go zone.

The invention claimed is:

1. A method for defining a no-go zone for an autonomous mower, the method comprising:

positioning the autonomous mower in a stationary pose, having a position and an orientation, adjacent to an area to avoid mowing, wherein positioning the autonomous mower includes pointing a forward direction of the autonomous mower at the area to avoid; and while the mower remains in the stationary pose, using the position and the orientation to set a perimeter bounding the area to avoid, wherein setting the perimeter includes selecting a predetermined perimeter shape and applying the predetermined perimeter shape at the position and in a direction of the orientation of the stationary pose, wherein the perimeter defines the no-go zone for the autonomous mower.

2. The method of claim 1, wherein setting the perimeter includes selecting a size of the perimeter.

3. The method of claim 1, wherein setting the perimeter includes selecting a position of the perimeter relative to the stationary pose.

4. The method of claim 1, wherein the perimeter corresponds to a series of GPS coordinates.

5. The method of claim 1, further comprising displaying the perimeter and obstacle in a display associated with the autonomous mower.

6. The method of claim 1, wherein setting the perimeter includes selecting an obstacle or area type associated with the no-go zone.

7. The method of claim 1, wherein storing the set perimeter includes storing a name associated with the no-go zone.

8. The method of claim 1, wherein setting a perimeter includes inputting setting commands through a human machine interface on the autonomous mower.

9. The method of claim 8, wherein the human machine interface includes at least one of a touch screen, a mouse, a joy stick, a smartpen/stylus, or a physical button.

10. A method for defining a mow zone and a no-go zone for an autonomous mower, the method comprising:

positioning the autonomous mower at a start point on a desired perimeter around an area to be mowed;

starting perimeter recording;

directing the autonomous mower to trace around the area to mow while recording positions of the autonomous mower;

stopping recording when the autonomous mower returns to or adjacent to the start point;

storing the recorded positions of the autonomous mower as a first perimeter defining a mow zone;

positioning the autonomous mower in a stationary pose having a position and an orientation, adjacent to an area to avoid mowing;

while the mower remains in the stationary pose, using the position and the orientation to set a second perimeter bounding the area to avoid mowing, wherein the second perimeter defines a no-go zone for the autonomous mower; and storing the set perimeter as the no-go zone before the storing of the recorded positions, checking that the first perimeter is a continuous, closed perimeter; and closing the first perimeter between the start point and an end point when the checked first perimeter is not continuous.

11. The method of claim 10, wherein navigating the autonomous mower includes manually navigating the autonomous mower.

12. The method of claim 10, wherein the recorded positions of the autonomous mower includes a plurality of waypoints at time intervals joined together to form a continuous line.

13. The method of claim 12, wherein the waypoints are measured with respect to a reference point on the autonomous mower.

14. The method of claim 12, further comprising before the storing, offsetting the first perimeter to one side of the plurality of waypoints.

15. The method of claim 10, further comprising displaying the second perimeter and area to avoid in a display associated with the autonomous mower.

16. The method of claim 10, wherein storing the second perimeter includes storing an obstacle or area type associated with the no-go zone.

* * * * *